(12) United States Patent
Ingram et al.

(10) Patent No.: US 11,407,185 B2
(45) Date of Patent: Aug. 9, 2022

(54) LAYUP TOOLS THAT FACILITATE TRANSFER OF LAMINATES TO CURE TOOLS

(71) Applicant: The Boeing Company, Chicago, IL (US)

(72) Inventors: Timothy Scott Ingram, New Castle, DE (US); Timothy Emile Brochon, Conshohocken, PA (US)

(73) Assignee: The Boeing Company, Chicago, IL (US)

( * ) Notice: Subject to any disclaimer, the term of this patent is extended or adjusted under 35 U.S.C. 154(b) by 813 days.

(21) Appl. No.: 15/845,640

(22) Filed: Dec. 18, 2017

(65) Prior Publication Data

US 2019/0184650 A1 Jun. 20, 2019

(51) Int. Cl.
| | | |
|---|---|---|
| B29C 33/48 | (2006.01) | |
| B29C 70/30 | (2006.01) | |
| B29C 70/44 | (2006.01) | |
| B29C 37/00 | (2006.01) | |
| B29C 33/68 | (2006.01) | |
| B29C 31/08 | (2006.01) | |
| B29L 31/30 | (2006.01) | |

(52) U.S. Cl.
CPC .............. B29C 70/30 (2013.01); B29C 31/08 (2013.01); B29C 33/485 (2013.01); B29C 33/68 (2013.01); B29C 37/0003 (2013.01); B29C 70/44 (2013.01); B29L 2031/3076 (2013.01)

(58) Field of Classification Search
CPC ........ B29C 33/48; B29C 33/485; B29C 70/44
See application file for complete search history.

(56) References Cited

U.S. PATENT DOCUMENTS

| | | | | | |
|---|---|---|---|---|---|
| 4,233,020 A | * | 11/1980 | Oswald | ................. | B29C 33/485 156/425 |
| 4,310,138 A | * | 1/1982 | Johnston | ............... | B29C 33/485 249/178 |
| 5,683,646 A | * | 11/1997 | Reiling, Jr. | ......... | B29C 33/0011 264/225 |

(Continued)

FOREIGN PATENT DOCUMENTS

| | | |
|---|---|---|
| EP | 0833733 A1 | 4/1998 |
| EP | 2103404 A2 | 9/2009 |

(Continued)

OTHER PUBLICATIONS

Search and Examination Report: Application GB1820204.4; dated Jun. 12, 2019.

(Continued)

*Primary Examiner* — Matthew J Daniels
(74) *Attorney, Agent, or Firm* — Duft & Bornsen, PC (57) ABSTRACT

Systems and methods are provided for adjustable tooling. One embodiment is a method that includes laying up a laminate of fiber reinforced material onto a continuous surface that has a convex profile and that comprises a first contoured surface of a fixed mold of a composite layup tool and a second contoured surface of a movable mold of the composite layup tool. The method also includes displacing the movable mold in a direction that is at least partially towards the fixed mold, breaking the continuous surface and releasing the laminate from the composite layup tool.

20 Claims, 13 Drawing Sheets

(56) References Cited

U.S. PATENT DOCUMENTS

| | | | |
|---|---|---|---|
| 5,875,732 A * | 3/1999 | Chapman | B63B 73/70 |
| | | | 114/357 |
| 6,692,681 B1 | 2/2004 | Lunde | |
| 7,083,698 B2 | 8/2006 | Engwall et al. | |
| 7,228,611 B2 | 6/2007 | Anderson et al. | |
| 7,640,961 B2 * | 1/2010 | Stubner | B29C 33/485 |
| | | | 156/443 |
| 7,935,289 B2 | 5/2011 | Anderson et al. | |
| 8,003,034 B2 | 8/2011 | Oldani et al. | |
| 2006/0145049 A1 * | 7/2006 | Blankinship | B29C 70/32 |
| | | | 249/66.1 |
| 2010/0154990 A1 | 6/2010 | Brennan et al. | |
| 2013/0074572 A1 * | 3/2013 | Bottome | B29C 33/485 |
| | | | 72/379.2 |
| 2019/0184650 A1 | 6/2019 | Ingram et al. | |

FOREIGN PATENT DOCUMENTS

| | | |
|---|---|---|
| EP | 2747987 A2 | 7/2014 |
| EP | 2747989 A2 | 7/2014 |
| WO | 9635567 A1 | 11/1996 |

OTHER PUBLICATIONS

GB Office action; Application GB1820204.4; dated May 27, 2022.
GB Examination Report; Application GB 1820204.4; dated Mar. 24, 2022.

* cited by examiner

LAYUP TOOLS THAT FACILITATE TRANSFER OF LAMINATES TO CURE TOOLS

This invention was made with Government support under contract number N00019-12-G-0006C awarded by the Department of Defense. The Government has certain rights in this invention.

FIELD

The disclosure relates to the field of composite parts, and in particular, to fiber reinforced composite parts.

BACKGROUND

Composite parts may be laid-up in complex contours in order to achieve desired properties. For example, some composite parts may exhibit contours having tight radii of curvature. Sometimes these tight radii and complex contours make laying up the laminate directly on the cure tool difficult or inefficient. In these instances, the laminate may be laid up on an intermediate layup tool and before being transferred to the cure tool. However, transfer processes between layup tools and curing tools remain complicated because there is little clearance between the layup tool and the female curing tool during the transfer process. This makes it harder to release the laminate from the layup tool. In some instances, the laminate may wrap around the layup tool to an extent that the layup tool can no longer be extracted from the laminate without distorting the laminate, which is commonly called a trapped condition. Distorting the laminate during removal is generally avoided whenever possible.

Therefore, it would be desirable to have a method and apparatus that take into account at least some of the issues discussed above, as well as other possible issues.

SUMMARY

Embodiments described herein provide layup tools that are capable of reducing their cross-sectional size in order to facilitate release of a laminate into a female curing tool. The process also facilitates extraction of the layup tool from the female curing tool after the laminate has been released. One embodiment is a method that includes laying up a laminate of fiber reinforced material onto a continuous surface that has a convex profile and that comprises a first contoured surface of a fixed mold of a composite layup tool and a second contoured surface of a movable mold of the composite layup tool. The method also includes displacing the movable mold in a direction that is at least partially towards the fixed mold, breaking the continuous surface and releasing the laminate from the composite layup tool.

A further embodiment is a non-transitory computer-readable medium storing instructions which, when performed by a processor, are operable for performing a method. The method includes laying up a laminate of fiber reinforced material onto a continuous surface that has a convex profile and that comprises a first contoured surface of a fixed mold of a composite layup tool and a second contoured surface of a movable mold of the composite layup tool. The method also includes displacing the movable mold in a direction that is at least partially towards the fixed mold, breaking the continuous surface and releasing the laminate from the composite layup tool.

A further embodiment is an apparatus. The apparatus includes a composite layup tool. The composite layup tool includes a fixed mold that defines a first contoured surface for receiving a first portion of a layup, and a movable mold that is disposed apart from the fixed mold and that defines a second contoured surface for receiving a second portion of the layup, the first contoured surface and the second contoured surface together define a continuous surface having a convex profile. The composite layup tool further includes a first end of the fixed mold abuts a second end of the movable mold and is angled parallel with a direction that proceeds at least partially towards the fixed mold, a first plurality of vacuum ports that penetrate through the fixed mold into the first contoured surface and apply suction at the first contoured surface that holds the layup to the first contoured surface, and a mechanism that displaces the movable mold in the direction, breaking the continuous surface and releasing the layup from the composite layup tool.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
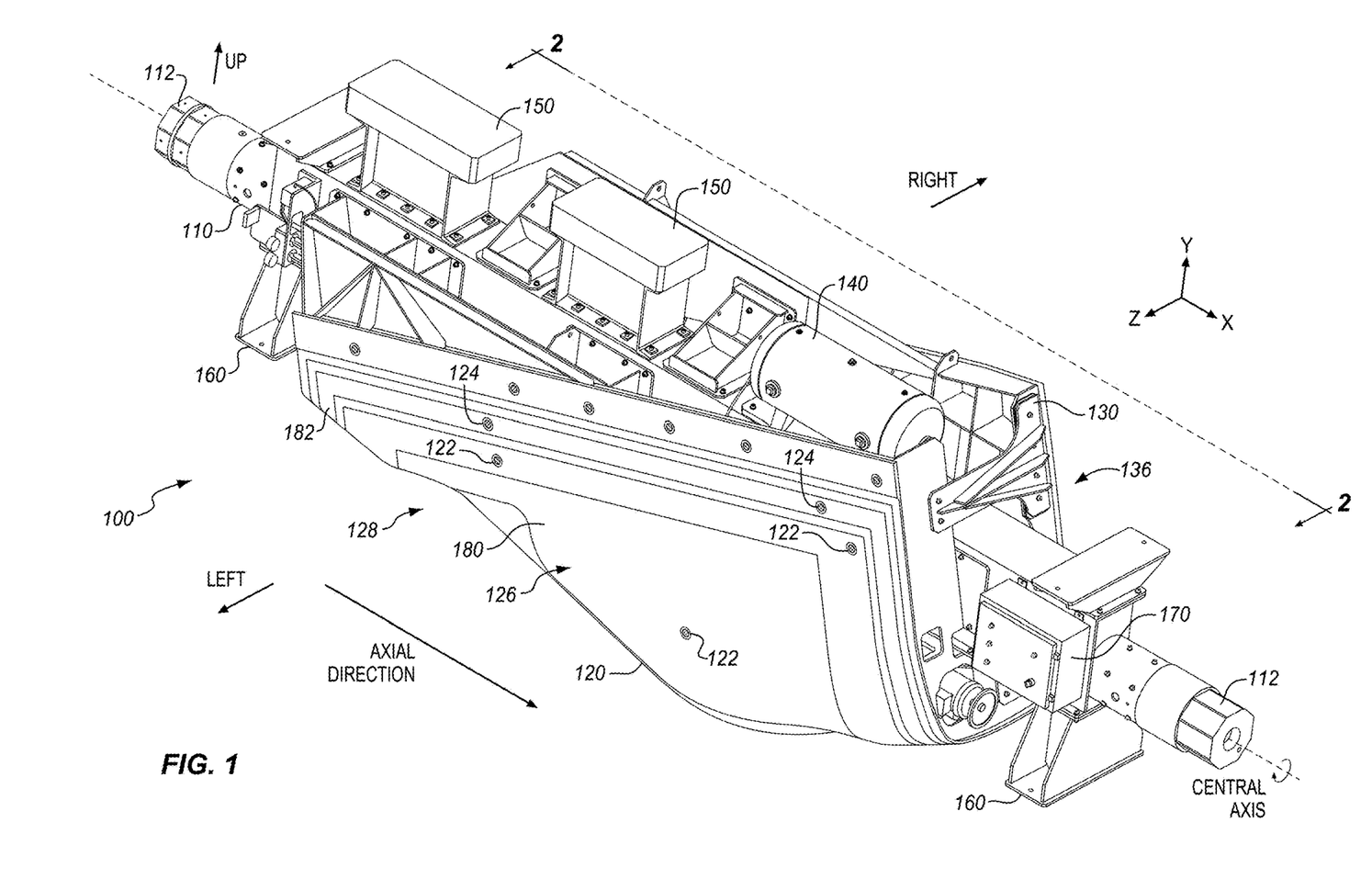
FIG. 1 is a perspective view of a layup tool in an illustrative embodiment.

FIG. 1 is a perspective view of a composite layup tool (hereinafter, "layup tool 100") in an illustrative embodiment. Layup tool 100 (e.g., a male layup tool) comprises any system, device, or component operable to receive a layup of multiple layers of fiber reinforced material (e.g., Carbon Fiber Reinforced Polymer (CFRP), aramid fibers, ceramic fibers in ceramic matrix, or Fiberglass Reinforced Plastic (FGRP)). In this embodiment, layup tool 100 comprises shaft 110, fixed mold 120, and movable mold 130. Shaft 110 is capable of being gripped at end stocks 112, and rotating about its central axis in order to facilitate layup of a laminate onto region 180 of fixed mold 120 and movable mold 130. Fixed mold 120 defines a first contoured surface 126 for receiving layers of the laminate, and is fixedly attached to shaft 110. Fixed mold 120 further includes a system 128 comprising a first set of ports 122, which use suction to hold a film (e.g., a release film) in place. A laminate (also referred to as a "layup") will then be laid-up onto region 180. FIG. 1 also depicts a second set of ports 124, which use suction to compress a vacuum bag (e.g., vacuum bag 410 of FIG. 4) placed atop the laminate over region 180 and region 182 (e.g., in order to compact the laminate after layup has been completed). Movable mold 130 defines a second contoured surface 136 that may be vertically oriented for receiving layers of the laminate, and is slidably attached to fixed mold 120.

Figure 4:
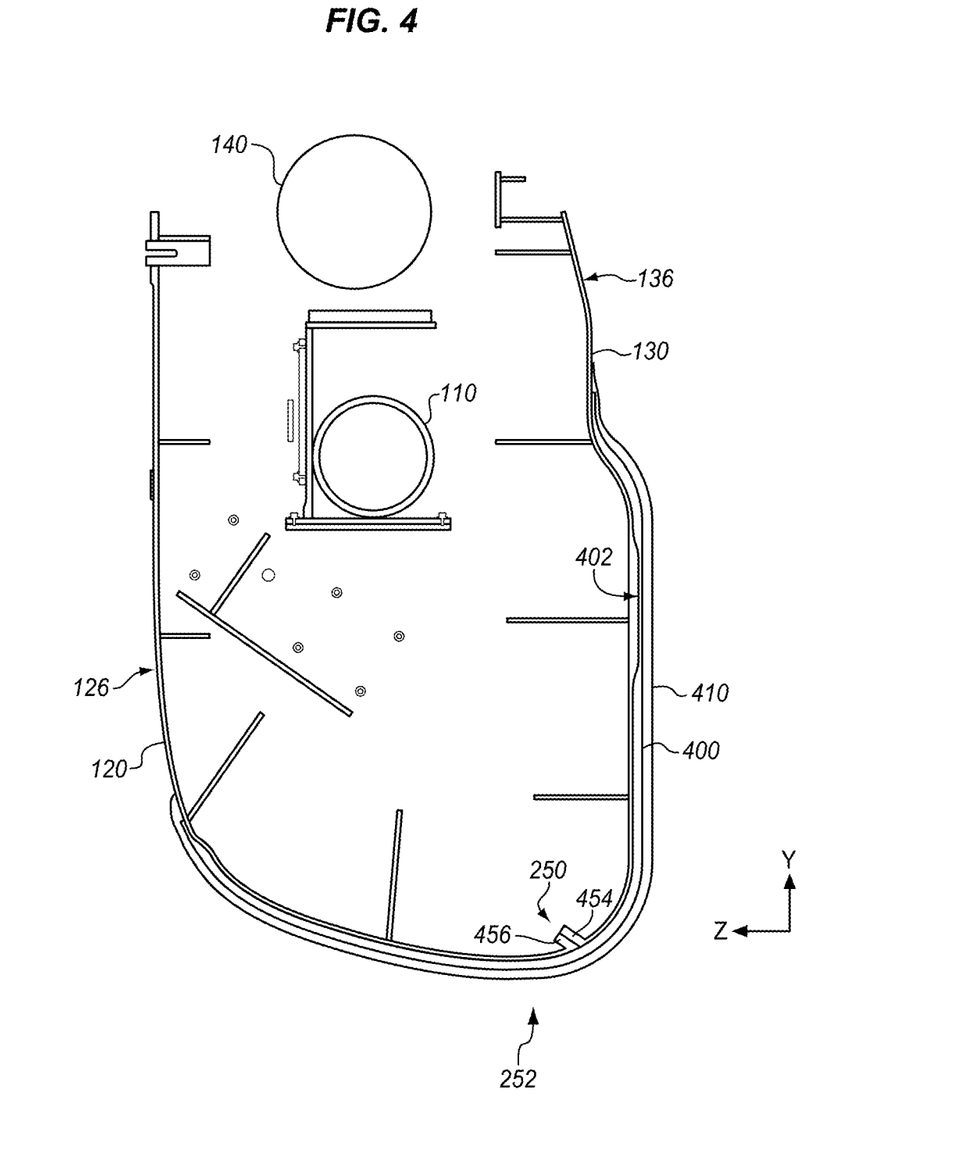
FIG. 4 is a section cut front view of a layup tool in an illustrative embodiment.

FIG. 1 further illustrates vacuum reservoir 140 which applies suction to ports which hold a release film (e.g., release film 402 of FIG. 4 in place. FIG. 1 additionally illustrates counterweights 150 which ensure that layup tool 100 has a center of mass that is aligned with the central axis of shaft 110, and standoffs 160 which enable layup tool 100 to be set down during maintenance. A controller 170 is also illustrated, which may be used to control operational components of layup tool 100, such as motors or vacuum ports. Controller 170 may be implemented, for example, as custom circuitry, as a hardware processor executing programmed instructions, or some combination thereof.

Figure 2:
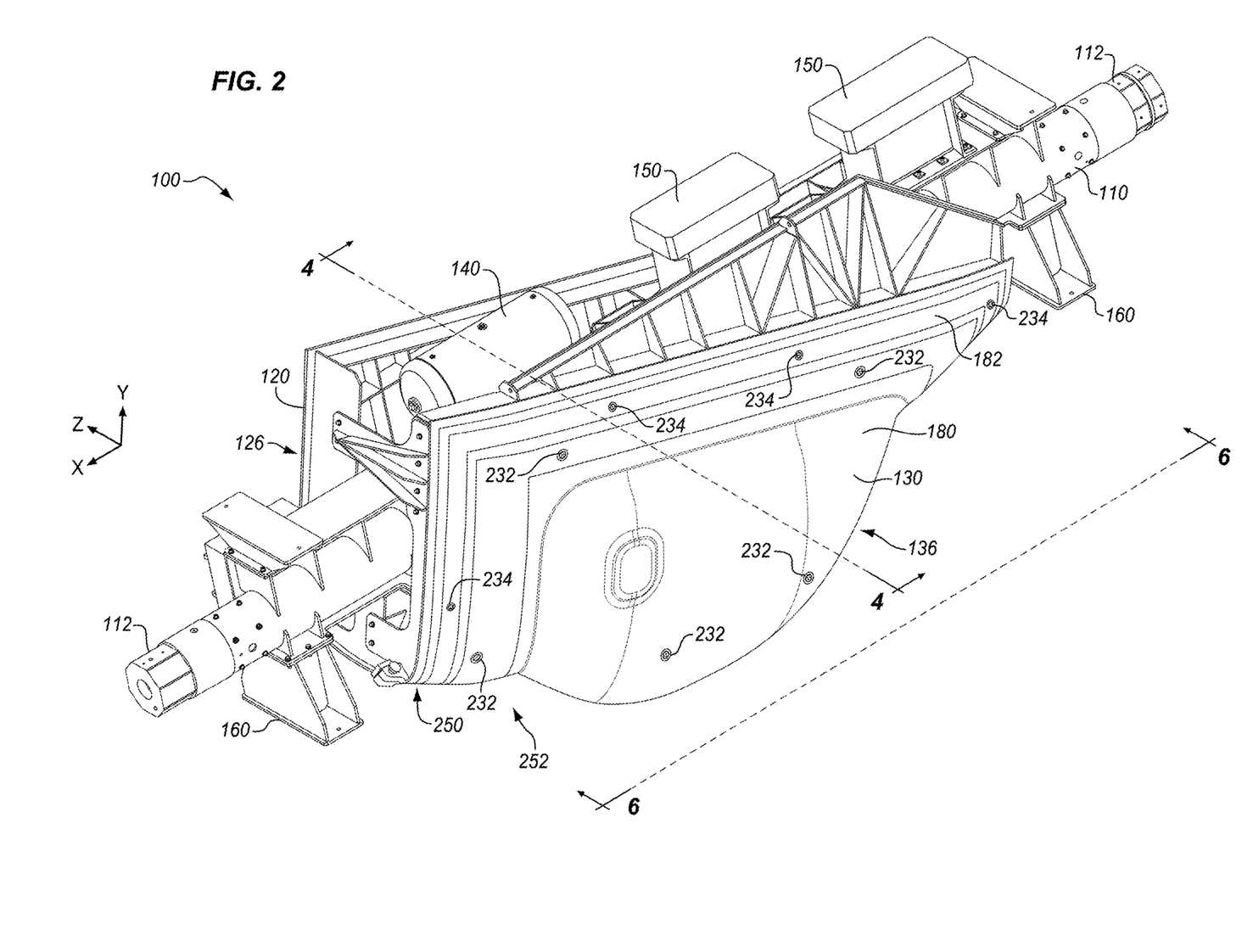
FIG. 2 is a further perspective view of the layup tool of FIG. 1 in an illustrative embodiment.

FIG. 2 is a further perspective view of the layup tool of FIG. 1 in an illustrative embodiment, and corresponds with view arrows 2 of FIG. 1. According to FIG. 2, movable mold 130 includes third set of ports 232, which hold the laminate 400 of FIG. 4 (or a film 402 of FIG. 4 that contacts layup tool 100) in place, as well as fourth set of ports 234, which compress a vacuum bag onto the laminate. Second contoured surface 136 of movable mold 130 unites with first contoured surface 126 of fixed mold 120 at intersection 250, resulting in a continuous surface 252 for laying up the laminate. In this embodiment, continuous surface 252 has a convex profile in that its cross-sections include at least one convexity.

Figure 3:
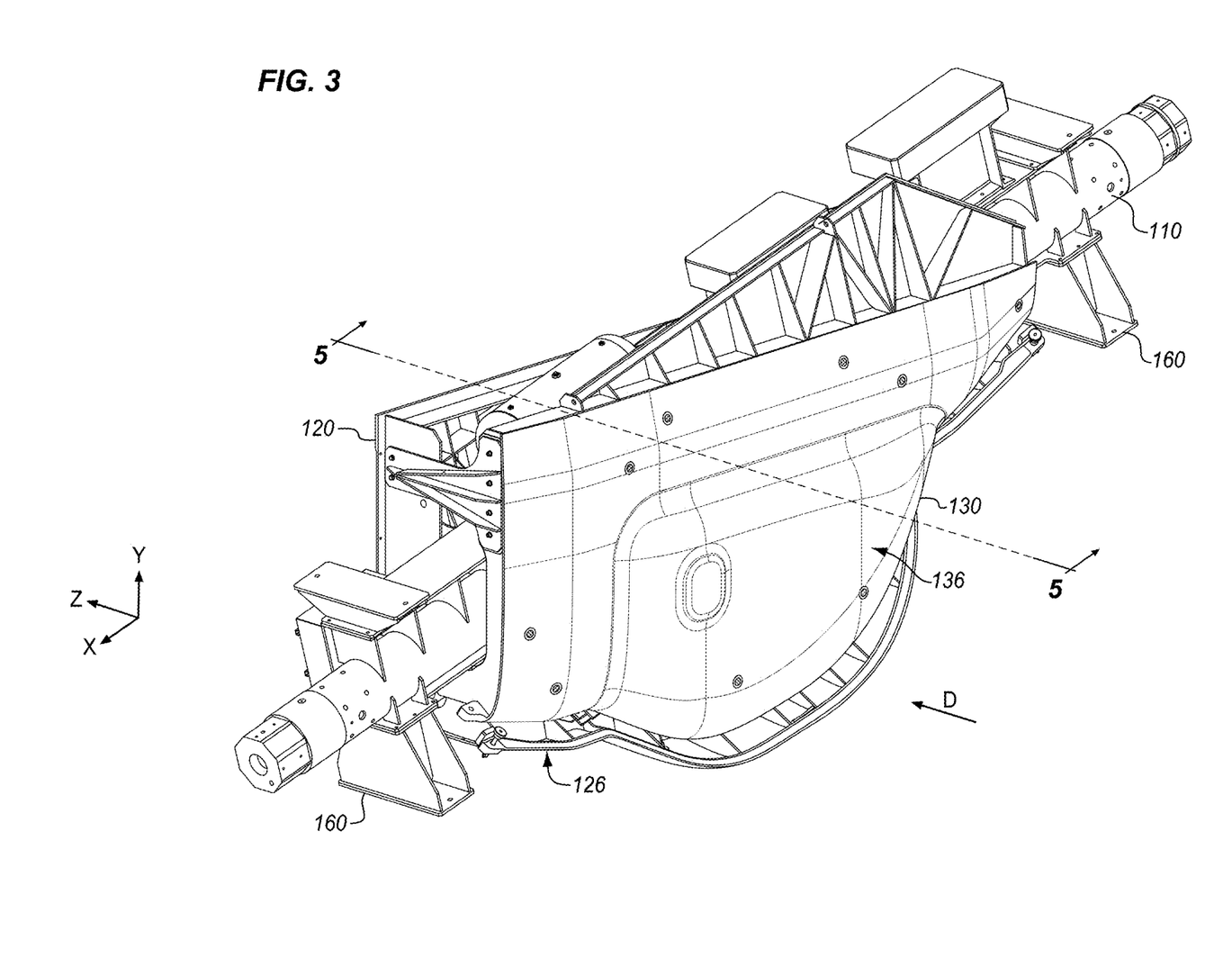
FIG. 3 is a perspective view of a layup tool that has been retracted in an illustrative embodiment.

FIG. 3 is a perspective view of a layup tool that has been retracted in an illustrative embodiment. FIG. 3 corresponds with the view shown in FIG. 2. The retraction process has displaced the movable mold 130 in direction D (e.g., upward and to the left), which breaks continuous surface 252 by separating second contoured surface 136 from first contoured surface 126. Layup tool 100 may also be referred to as an Inner Mold Line (IML) tool, because continuous surface 252 defines the IML for laminate 400 of FIG. 4. During retraction of layup tool 100, the continuous surface 252 is broken, breaking the IML and translating a portion of layup tool 100 away from a laminate 400 enough to clear any potential locations of interference that would otherwise exist when layup tool 100 is being removed.

Figure 5:
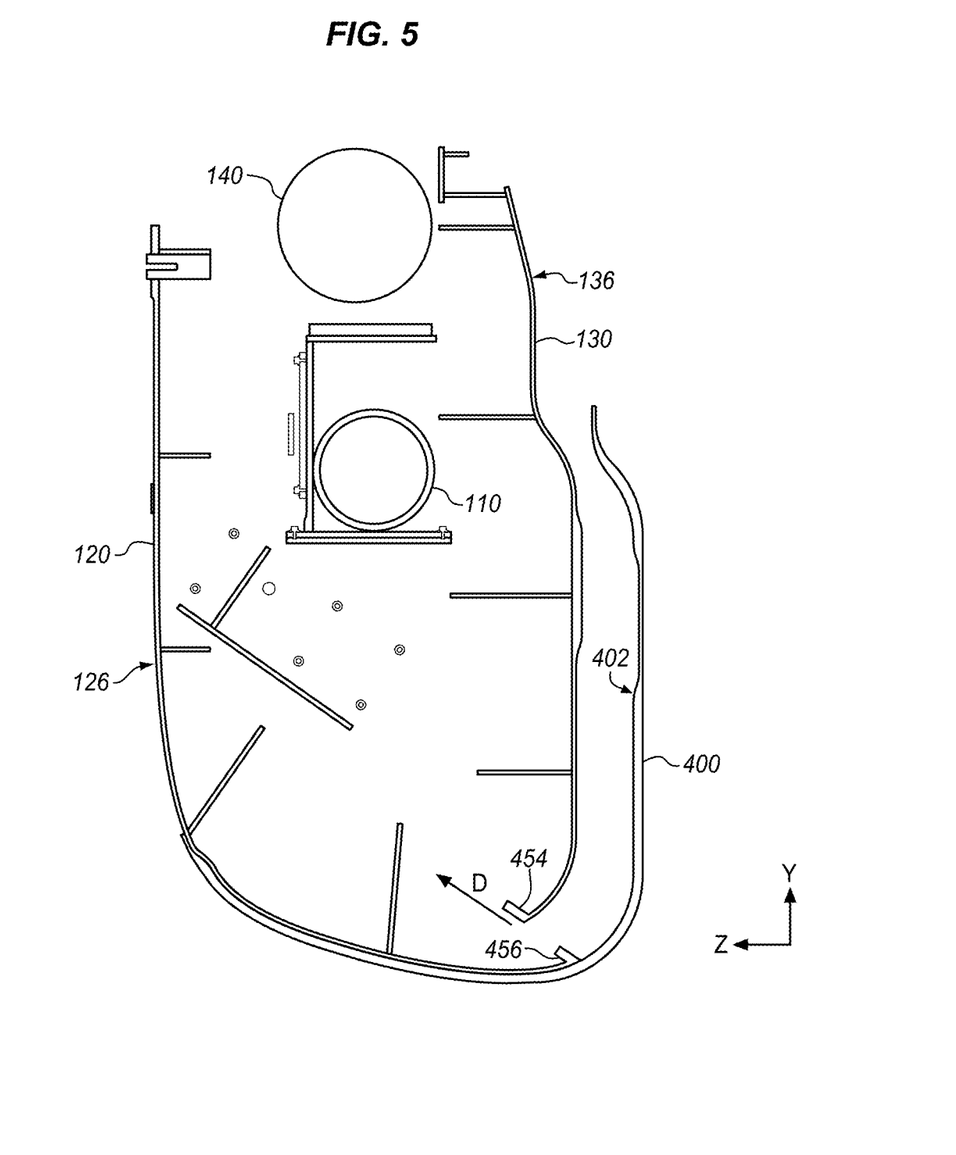
FIG. 5 is a section cut front view of a layup tool that has been retracted in an illustrative embodiment.

FIG. 4 is a section cut front view of a layup tool in an illustrative embodiment. Specifically, FIG. 4 corresponds with view arrows 4 of FIG. 2. In this view, a laminate 400 has been laid-up onto continuous surface 252, including first contoured surface 126, second contoured surface 136, and intersection 250. Laminate 400 is "green" in that laminate 400 has not yet been hardened/cured into a composite part. Laminate 400 has been covered by vacuum bag 410. Continuity of continuous surface 252 is achieved by left end 454 of second contoured surface 136 contacting right end 456 of first contoured surface 126. Both left end 454 and right end 456 continue upward and to the left, forming ramps. That is, both left end 454 and right end 456 are oriented parallel with a direction that proceeds at least partially towards fixed mold 120. FIG. 5 is a section cut front view of a layup tool that has been retracted in an illustrative embodiment, and corresponds with view arrows 5 of FIG. 3. Vacuum bag 410 has been removed prior to retracting the layup tool 100. As shown in FIG. 5, displacement of movable mold 130 breaks the continuous surface and separates laminate 400 from second contoured surface 136. This facilitates transfer of laminate 400 from layup tool 100 to another component, such as a female cure tool. Furthermore, displacement of movable mold 130 allows laminate 400 to be removed from a trapped condition geometry. Thus, a portion of the IML surface is moved away from the laminate 400 far enough to clear any potential locations of interference that would otherwise exist when layup tool 100 is being removed.

Figure 6:
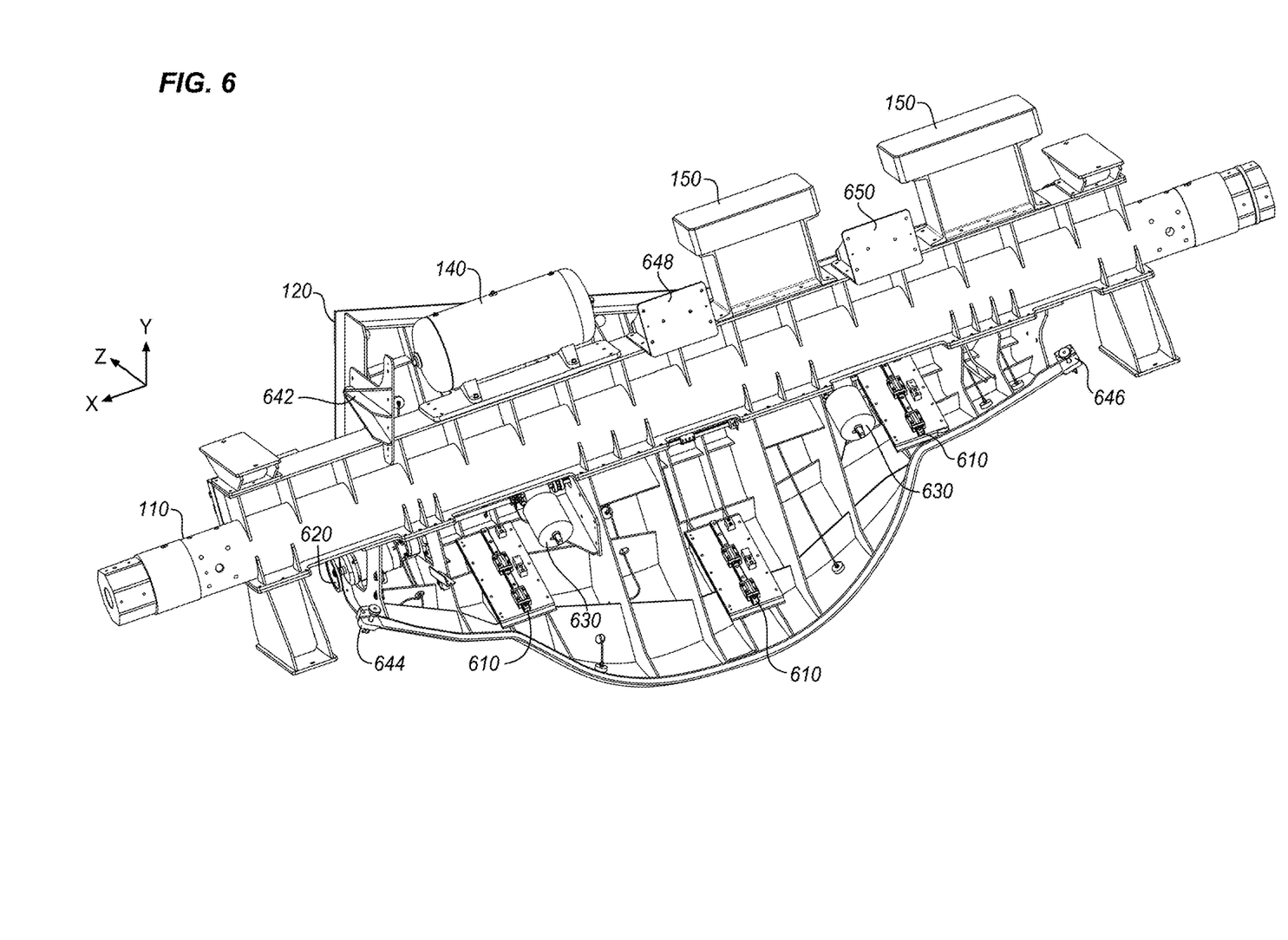
FIG. 6 is a perspective view of internal components of a layup tool in an illustrative embodiment.

FIG. 6 is a perspective view of internal components of a layup tool 100 in an illustrative embodiment. FIG. 6 illustrates that movable mold 130 of FIG. 1 is slidably attached to fixed mold 120 via a combination of actuators 630 and linear rails 610, which are driven by a mechanism (e.g., motor 620), enabling precisely controlled motion of movable mold 130. However, in further embodiments any suitable system may be utilized to drive actuators 630 and linear rails 610, such as pneumatic systems, hydraulic systems, manual systems, hinges, etc. In this manner, operation of motor 620 causes movable mold 130 to be displaced in an effective, repeatable, and controllable manner. Attachment plates 642, 644, 646, 648, and 650 are also illustrated. These attachment plates may be utilized to fixedly attach movable mold 130 to fixed mold 120 during layup via removable fasteners (not shown) that prevent motion of movable mold 130, and then may be removed or unbolted in order to enable movable mold 130 to be displaced during the transfer of laminate 400.

Illustrative details of the operation of layup tool 100 will be discussed with regard to FIG. 7. Assume, for this embodiment, that layup tool 100 is currently awaiting layup of a laminate, which will be transferred to a female curing tool (which may also be described as an "Outer Mold Line" (OML) tool) and then cured. Thus, movable mold 130 is presently fixedly attached to fixed mold 120 via attachment plates 642-650.

Figure 7:
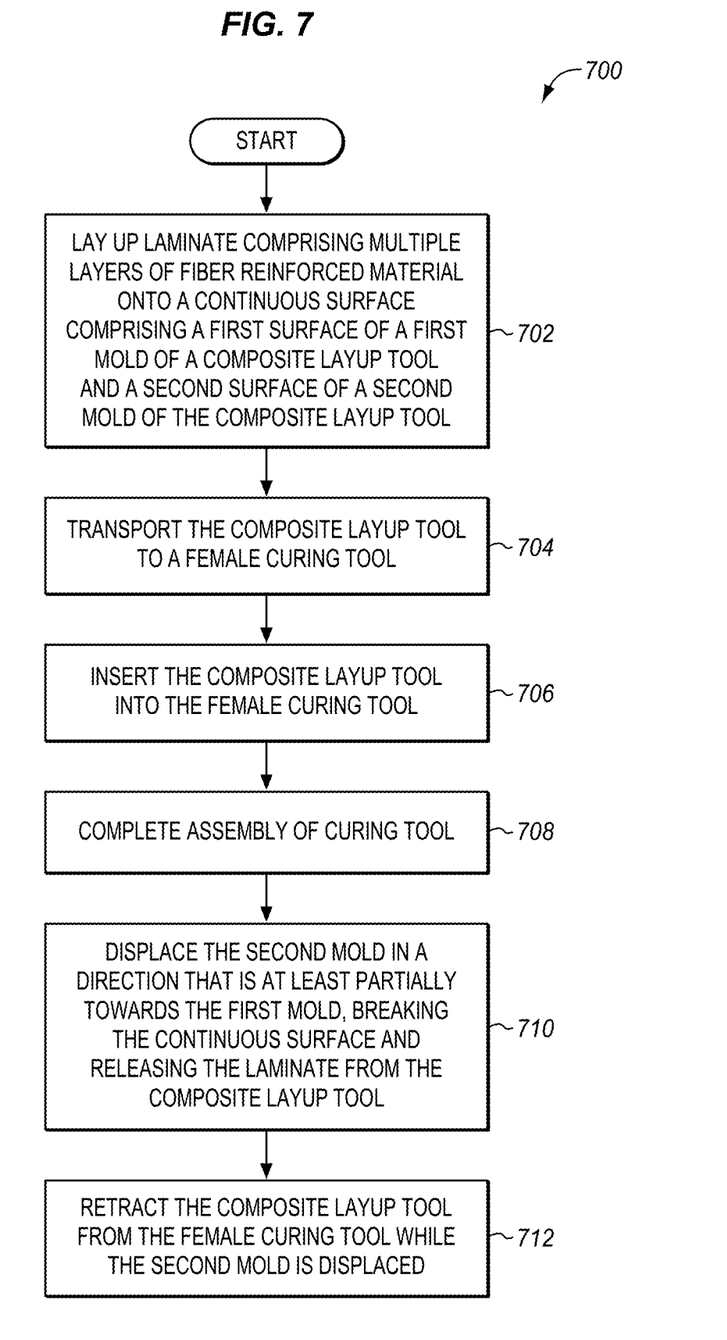
FIG. 7 is a flowchart illustrating a method for utilizing a layup tool in an illustrative embodiment.

FIG. 7 is a flowchart illustrating a method 700 for utilizing a layup tool in an illustrative embodiment. The steps of method 700 are described with reference to layup tool 100 of FIG. 1, but those skilled in the art will appreciate that method 700 may be performed in other systems. The steps of the flowcharts described herein are not all inclusive and may include other steps not shown. The steps described herein may also be performed in an alternative order.

An Automated Fiber Placement (AFP) machine, other component, or technician lays up a laminate 400 comprising multiple layers of fiber reinforced material onto region 180 of continuous surface 252 (e.g., in accordance with a Numerical Control (NC) program) (step 702). Continuous surface 252 comprises first contoured surface 126 of fixed mold 120, and second contoured surface 136 of movable mold 130 of layup tool 100. During the layup process, vacuum reservoir 140 draws suction at first set of ports 122 and third set of ports 232. This adheres laminate 400 (or a film that contacts layup tool 100) to layup tool 100. Upon completion of the layup process, a vacuum bag (e.g., vacuum bag 410 of FIG. 4) is placed over laminate 400 at region 180, and is further placed over region 182. Suction is drawn at second set of ports 124 and fourth set of ports 234. This compresses the vacuum bag onto laminate 400, compressing laminate 400.

To prepare for transport of laminate 400 to a curing tool, bolts are removed from attachment plates 642-650. This causes movable mold 130 to be slidably attached to fixed mold 120 via linear rails 610. Hence, motor 620 is now capable of slidably displacing the movable mold 130 from fixed mold 120 in order to break continuous surface 252 of layup tool 100 (which defines the IML for laminate 400).

Figure 8:
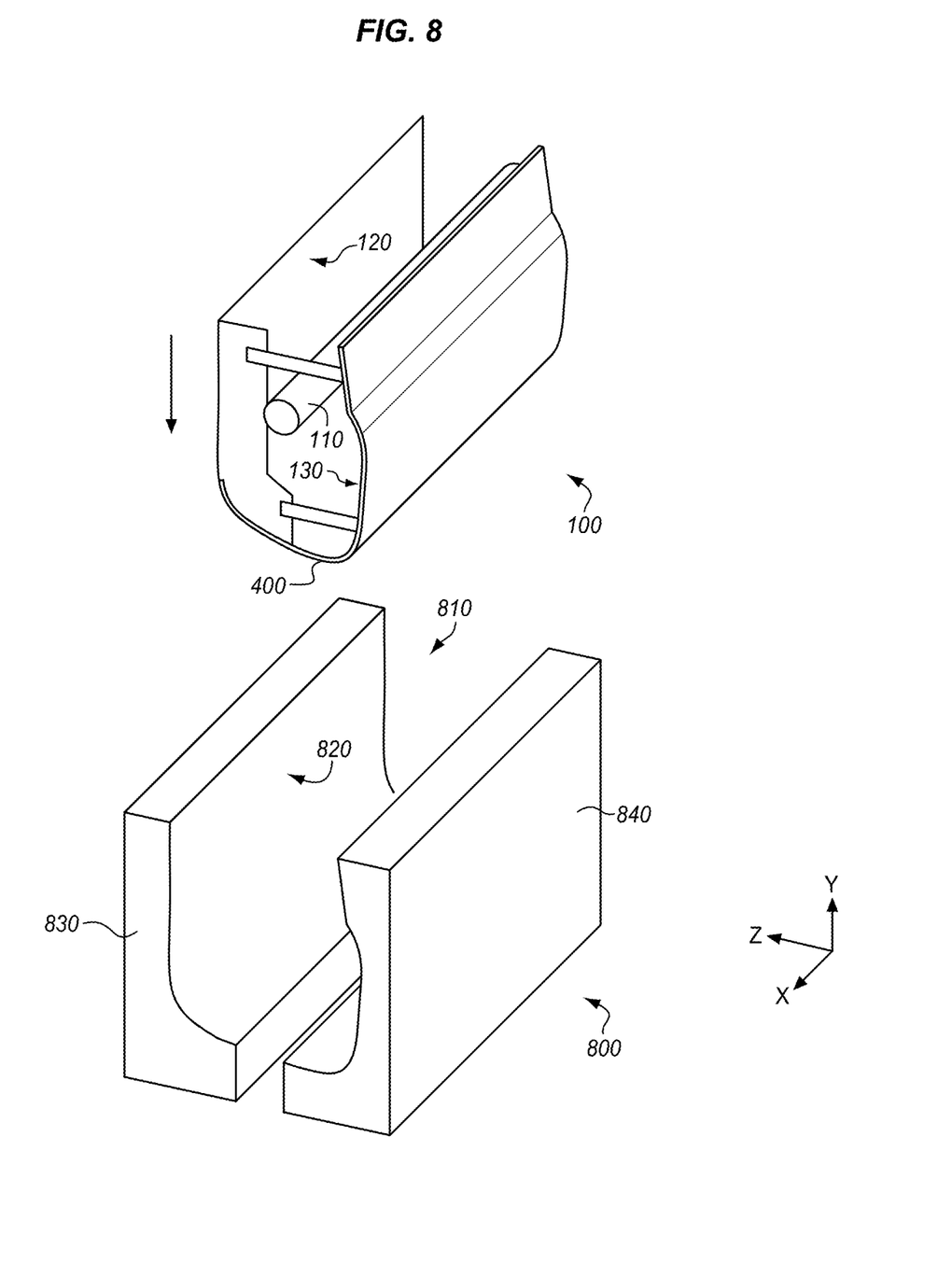
FIGS. 8-12 illustrate transfer of a laminate from a layup tool to a female curing tool in an illustrative embodiment.
Figure 9:
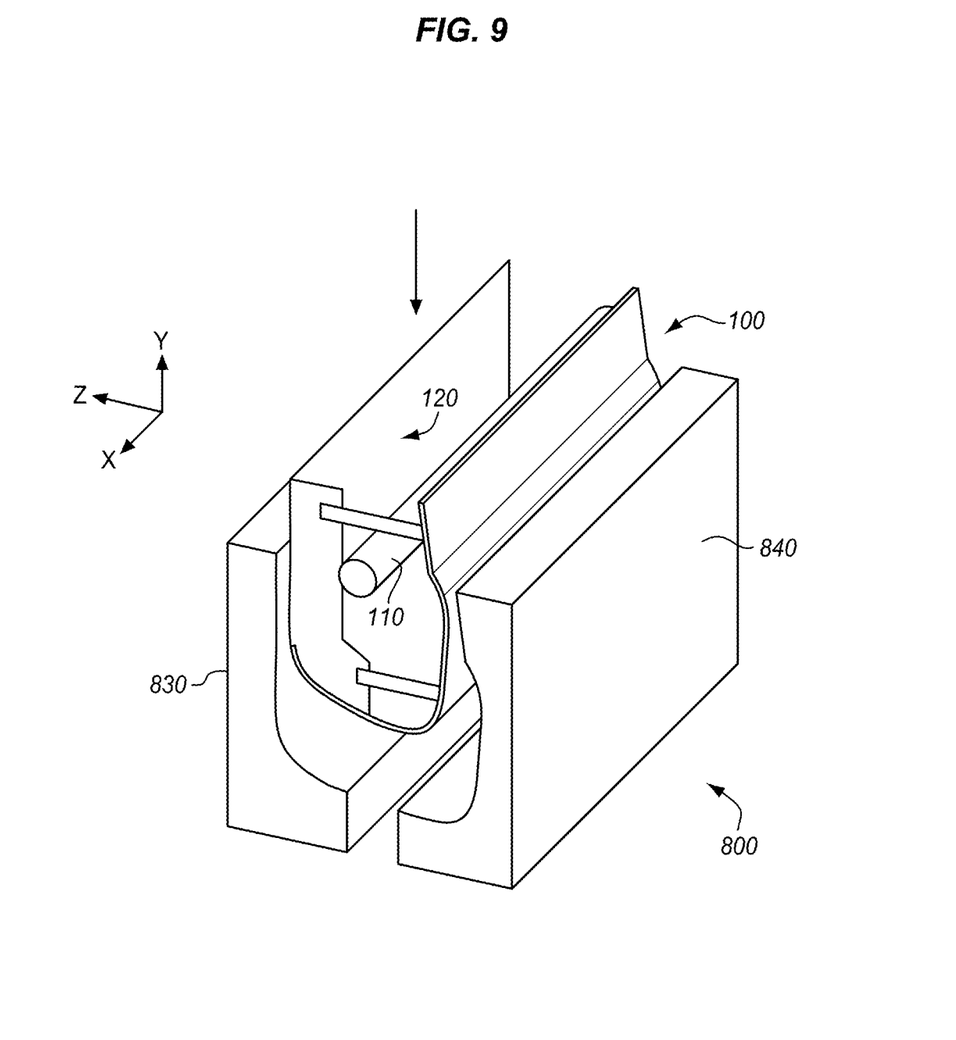
Figure 10:
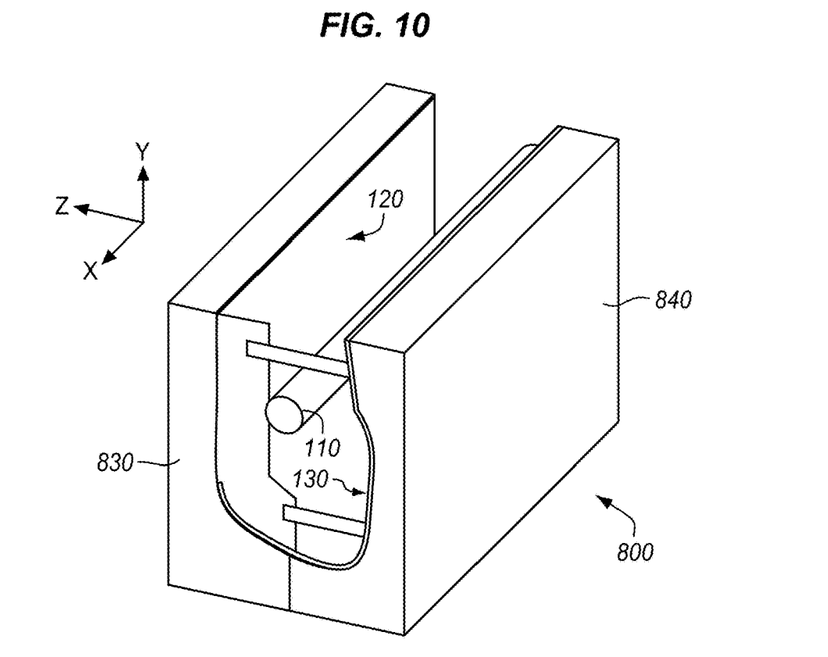

With layup completed, layup tool 100 (which is male) is transported to a female curing tool (step 704). Because layup tool 100 is rigid, the form of laminate 400 may be maintained stably when layup tool 100 is utilized as a transfer medium for moving laminate 400 to a female curing tool. For example, layup tool 100 may be transported to the vicinity of a corresponding female curing tool. Layup tool 100 is further inserted into the female curing tool (step 706). For example, as shown in FIGS. 8-10, controller 170 may direct operations that move the entirety of layup tool 100 along the Y direction, into cavity 810 defined by surface 820 of a female curing tool 800. In further embodiments, layup tool 100 may even be moved along the X direction or even the Z direction, depending on the thickness of first segment 830 and second segment 840 of female curing tool 800.

With layup tool 100 successfully inserted into female curing tool 800, assembly of female curing tool 800 is completed, for example, by drawing first segment 830 and second segment 840 together (step 708). With female curing tool 800 assembled, controller 170 directs motor 620 to displace movable mold 130 in a direction that is at least partially towards fixed mold 120 (i.e., upward and to the left with respect to fixed mold 120) (step 710). This breaks continuous surface 252 by separating left end 454 of movable mold 130 from right end 456 of fixed mold 120, and releases the laminate 400 (or a release film 402 coupled thereto) from layup tool 100. This also reduces the cross-sectional size of layup tool 100, which means that layup tool 100 may now be extracted from female curing tool 800 without contacting laminate 400. This makes the extraction of the layup tool 100 from female curing tool 800 possible after laminate 400 has been released.

Figure 11:
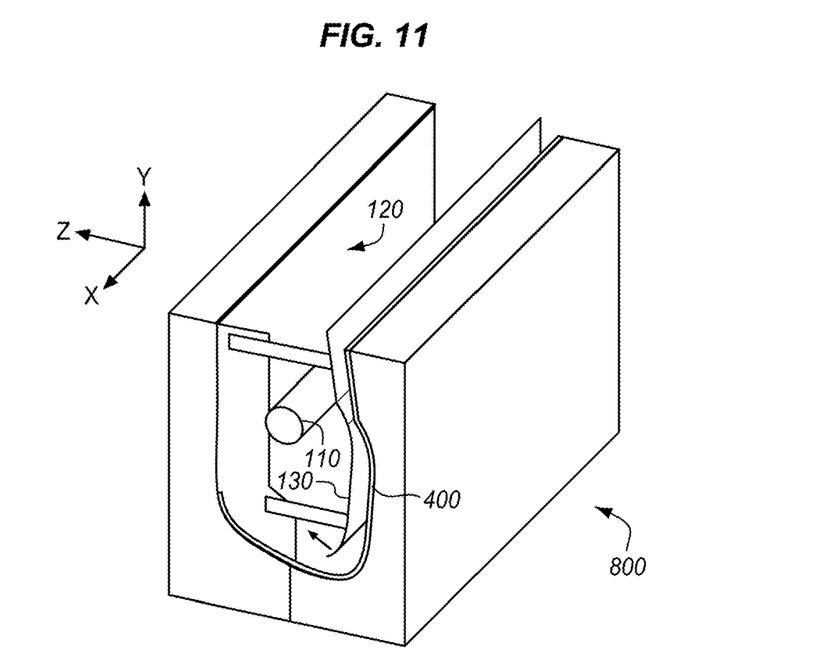
Figure 12:
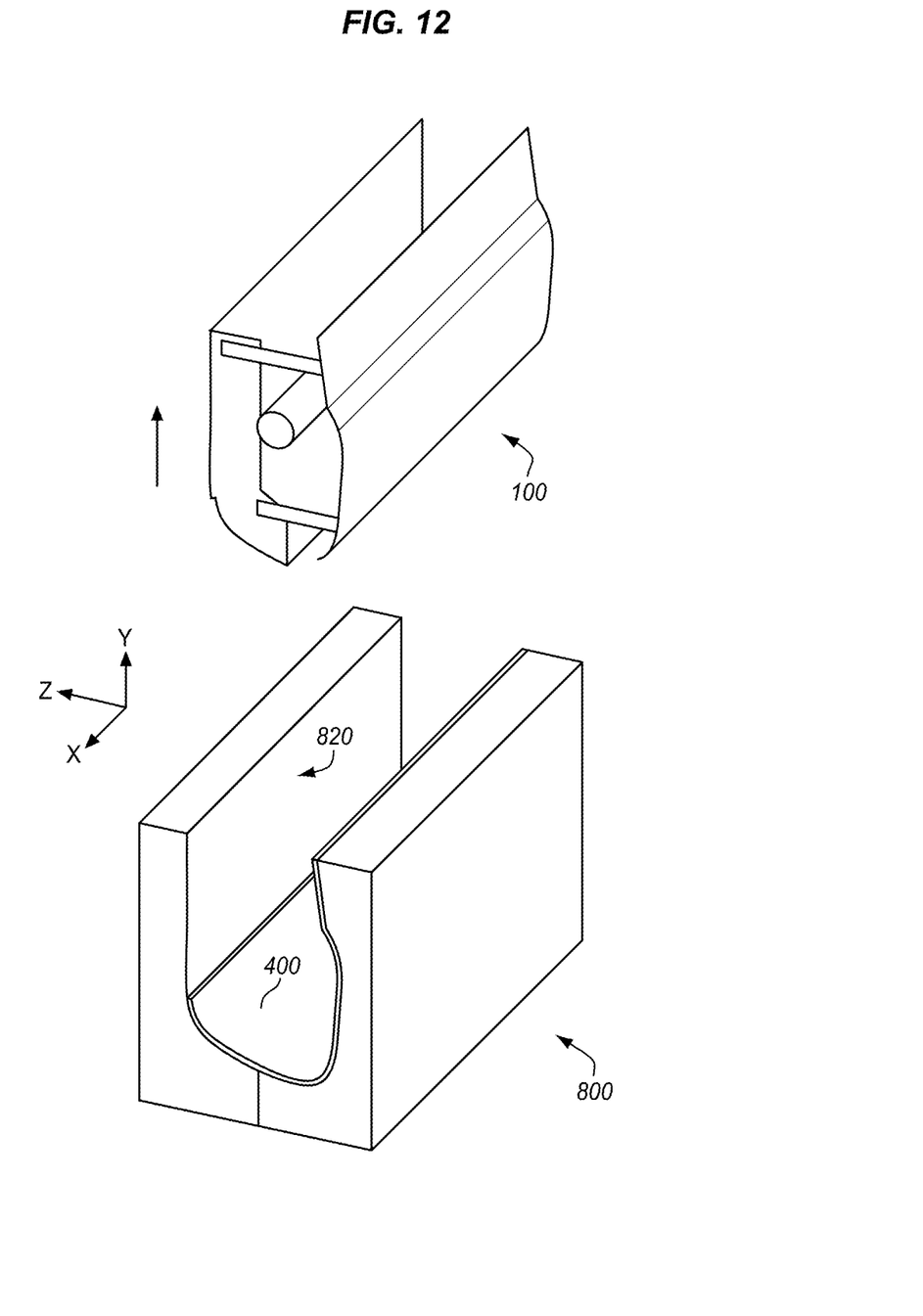

Controller 170 further directs the retraction of layup tool 100 from female curing tool 800 (e.g., an OML tool) while second contoured surface 136 of movable mold 130 is displaced (step 712). This process is illustrated in FIGS. 11-12. Laminate 400 may then be hardened and/or cured into a composite part. Method 700 facilitates insertion and removal of layup tool 100 at female curing tool 800, because it allows for layup tool 100 to be reduced in cross-sectional size before it is removed from female curing tool 800. Any laminates laid-up onto layup tool 100 are released when layup tool 100 shrinks in size, and layup tool 100 may exit the female curing tool 800 without interference while its size is reduced. This feature for facilitating the transfer of laminates between male layup tools and female curing tools means that laminates having a locked condition geometry may be laid-up onto male (i.e., IML) tooling, which is a substantially less complex and time-consuming process than laying up such laminates on female (i.e., OML) tooling. At the same time, laminates can be easily transferred from male tooling used during layup, to female tooling used for curing. Curing on female tooling is highly desirable, because removal of a cured/hardened composite part from a male tool may be substantially harder. Hence, layup tool 100, and method 700 advantageously allow fabrication processes to utilize the layup-related benefits of male tooling, as well as the cure-related benefits of female tooling.

Method 700 provides a substantial advantage over prior techniques, because its process for utilizing two complementary molds which are movable with respect to each other allows for layup tool 100 to reduce its cross-sectional size when a laminate is transferred. This provides a benefit in releasing the laminate from the layup tool. This technique provides a further benefit in reducing the cross-sectional area of the layup tool, enabling the layup tool to be easily removed from the female curing tool when a trapped condition geometry exists. Hence, the chance of preserving laminate integrity while a laminate is being transferred is increased.

EXAMPLES

In the following examples, additional processes, systems, and methods are described in the context of layup tools for composite parts.

Figure 13:
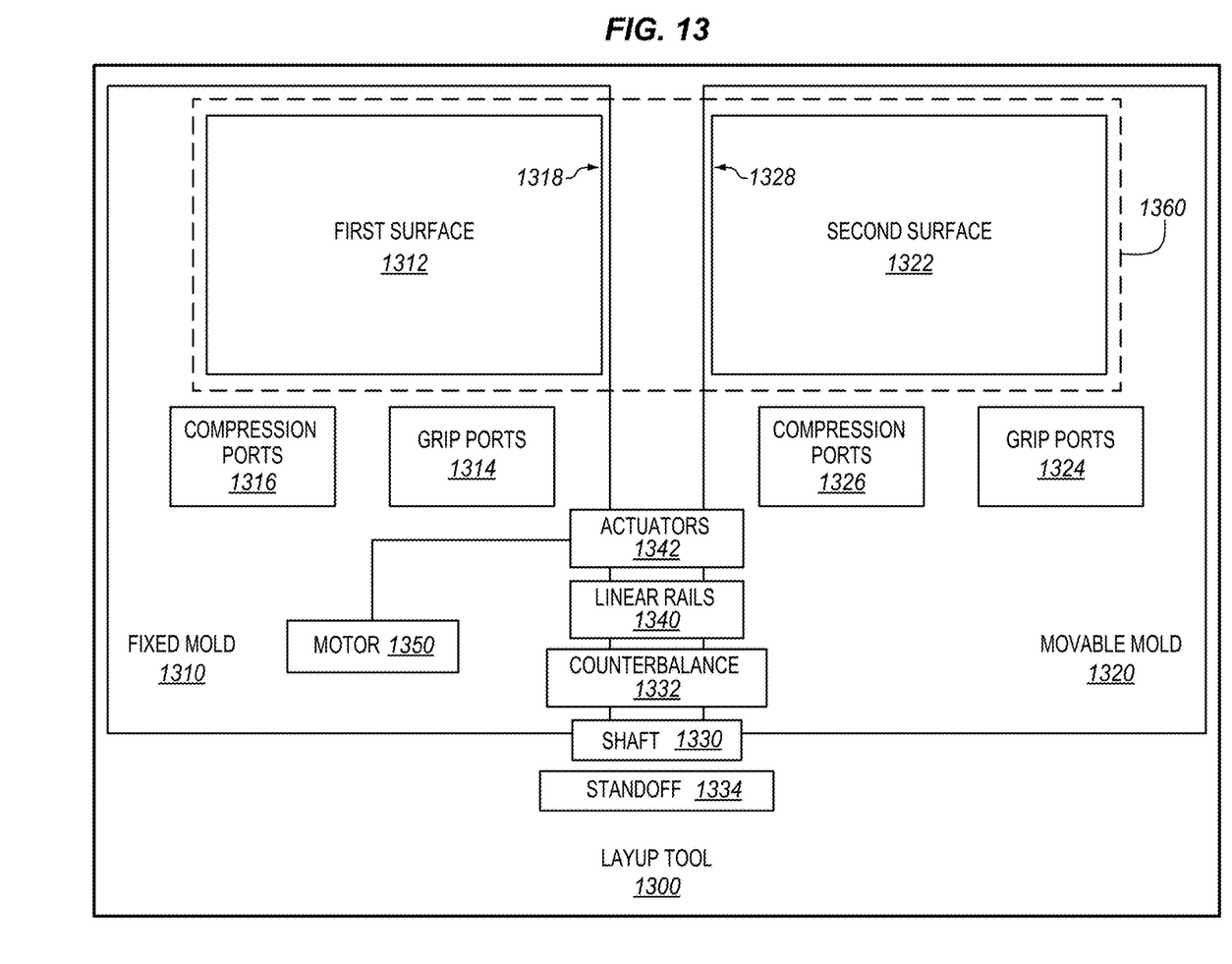
FIG. 13 is a block diagram of a layup tool in an illustrative embodiment.

FIG. 13 is a block diagram of a layup tool 1300 in an illustrative embodiment. According to FIG. 13, layup tool 1300 includes shaft 1330, having attached counterweight 1332 and standoff 1334. Fixed mold 1310 is fixedly attached to shaft 1330, and defines a first contoured surface 1312 having a first end 1318. Fixed mold 1310 further includes a first set of ports comprising grip ports 1314 that apply suction to a laminate (or a film to which the laminate is applied), and compression ports 1316 that apply suction to a vacuum bag placed over the laminate.

In further embodiments, it is possible to retract at a bulge by moving multiple surfaces defining halves of the bulge towards each other, and then optionally retracting the multiple surfaces into the layup tool. Therefore, there is opportunity to collapse a bulge at a layup tool into a smaller bulge prior to or during retraction into the rest of the layup tool. Movable mold 1320 is slidably attached to fixed mold 1310 via linear rails 1340, such that movable mold 1320 is displaced when motor 1350 drives actuators 1342. Linear rails 1340 are also depicted. Movable mold 1320 defines second contoured surface 1322 having second end 1328. When layup occurs, second end 1328 contacts the first end 1318, resulting in continuous surface 1360. When layup has been completed, layup tool 1300 is inserted into a female curing tool, and motor 1350 is utilized to displace movable mold 1320 with respect to fixed mold 1310. This releases the laminate and facilitates removal of layup tool 1300 from the female curing tool. While a fixed and movable mold are illustrated in FIG. 13, in further embodiments, any suitable number of molds may be used, and/or any number of those molds may be movable.

Note that first contoured surface 1312 and second contoured surface 1322 may be located as desired to ensure that no interference exists when layup tool 1300 is removed from a cure tool, and hence may be oriented vertically, laterally, at an angle, etc. Furthermore, a movable portion or surface of a mold may be designed for placement at locations where bulges are located in a laminate or at layup tool 1300. For example, a movable portion or surface may be placed at an end of layup tool 1300 if a bulge is nearby, or may be placed in any suitable location. Layup tool 1300 may be strategically designed specifically to include movable portions or surfaces at locations where a laminate will exhibit a bulge.

Figure 14:
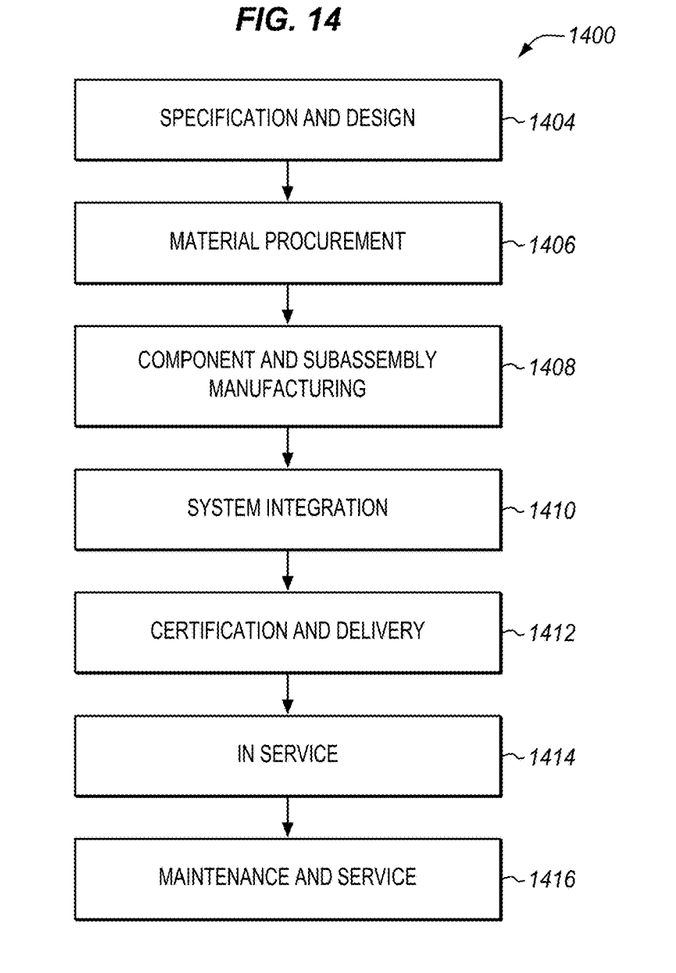
FIG. 14 is a flow diagram of aircraft production and service methodology in an illustrative embodiment.
Figure 15:
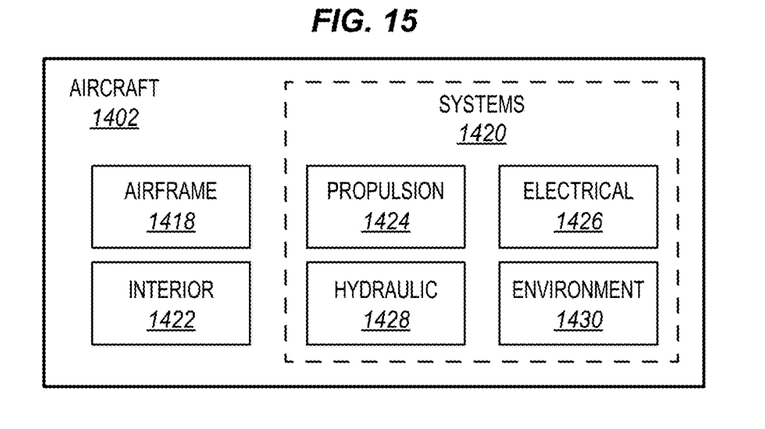
FIG. 15 is a block diagram of an aircraft in an illustrative embodiment.

Referring more particularly to the drawings, embodiments of the disclosure may be described in the context of an aircraft manufacturing and service method 1400 as shown in FIG. 14 and an aircraft 1402 as shown in FIG. 15. During pre-production, illustrative method 1400 may include specification and design 1404 of the aircraft 1402 and material procurement 1406. During production, component and subassembly manufacturing 1408 and system integration 1410 of the aircraft 1402 takes place. Thereafter, the aircraft 1402 may go through certification and delivery 1412 in order to be placed in service 1414. While in service by a customer, the aircraft 1402 is scheduled for routine maintenance and service 1416 (which may also include modification, reconfiguration, refurbishment, and so on). Apparatus and methods embodied herein may be employed during any one or more suitable stages of the production and service method 1400 (e.g., specification and design 1404, material procurement 1406, component and subassembly manufacturing 1408, system integration 1410, certification and delivery 1412, service 1414, maintenance and service 1416) and/or any suitable component of aircraft 1402 (e.g., airframe 1418, systems 1420, interior 1422, propulsion 1424, electrical 1426, hydraulic 1428, environmental 1430).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 1402 produced by illustrative method 1400 may include an airframe 1418 with a plurality of systems 1420 and an interior 1422. Examples of high-level systems 1420 include one or more of a propulsion system 1424, an electrical system 1426, a hydraulic system 1428, and an environmental system 1430. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1400. For example, components or subassemblies corresponding to production stage 1408 may be fabricated or manufactured in a manner similar to components or subassemblies produced while the aircraft 1402 is in service. Also, one or more apparatus embodiments, method embodiments, or a combination thereof may be utilized during the production stages 1408 and 1410, for example, by substantially expediting assembly of or reducing the cost of an aircraft 1402. Similarly, one or more of apparatus embodiments, method embodiments, or a combination thereof may be utilized while the aircraft 1402 is in service, for example and without limitation, to maintenance and service 1416. For example, the techniques and systems described herein may be used for steps 1406, 1408, 1410, 1414, and/or 1416, and/or may be used for airframe 1418 and/or interior 1422. These techniques and systems may even be utilized for systems 1420, including for example propulsion 1424, electrical 1426, hydraulic 1428, and/or environmental 1430.

In one embodiment, a composite part laid-up onto layup tool 100 comprises a portion of airframe 1418, and is manufactured during component and subassembly manufacturing 1408. The part may then be assembled into an aircraft in system integration 1410, and then be utilized in service 1414 until wear renders the part unusable. Then, in maintenance and service 1416, the part may be discarded and replaced with a newly manufactured part fabricated via layup tool 100. Inventive components and methods may be utilized throughout component and subassembly manufacturing 1408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
  laying up a laminate of fiber reinforced material onto a continuous surface that has a convex profile in contact with a first contoured surface of a fixed mold of a composite layup tool and in contact with a second contoured surface of a movable mold of the composite layup tool;
  translating the movable mold in a direction that is at least partially towards the first contoured surface of the fixed mold, breaking the continuous surface and releasing the laminate from the composite layup tool;
  transferring the laminate to a curing tool after the movable mold has been translated; and
  hardening the laminate at the curing tool after the transferring has been completed.

2. The method of claim 1 further comprising:
placing a film at the continuous surface that facilitates separation of the laminate from the composite layup tool;
drawing a first suction that holds the film at the continuous surface; and
laying up the laminate while the first suction is drawn.

3. The method of claim 2 further comprising:
releasing the first suction after inserting the composite layup tool into the curing tool.

4. The method of claim 2 further comprising:
placing a vacuum bag over the laminate; and
drawing a second suction that compresses the vacuum bag onto the laminate.

5. The method of claim 4 further comprising:
releasing the second suction after compressing the vacuum bag onto the laminate; and
removing the vacuum bag from the laminate prior to inserting the composite layup tool into the curing tool.

6. The method of claim 1 further comprising:
curing the laminate while the laminate is inserted into the curing tool to form a composite part.

7. The method of claim 1 wherein:
laying up the laminate of the fiber reinforced material comprises laying up multiple layers of the fiber reinforced material.

8. The method of claim 1 wherein:
the curing tool is a female curing tool.

9. The method of claim 1 wherein:
translating the movable mold enables the laminate to be removed from a trapped condition geometry.

10. The method of claim 9 further comprising:
retracting the composite layup tool from the curing tool and the laminate while the movable mold is translated.

11. The method of claim 1 further comprising:
moving the movable mold relative to the fixed mold via linear rails.

12. The method of claim 1 wherein:
the fiber reinforced material comprises fiber reinforced polymer.

13. The method of claim 1 wherein:
the laminate has not yet been hardened into a composite part before transfer to the curing tool.

14. A method comprising fabricating a portion of an aircraft, the method comprising:
providing a composite layup tool comprising:
a fixed mold that defines a first contoured surface for receiving a first portion of a convex profile of a layup;
a movable mold that is disposed apart from the fixed mold and that defines a second contoured surface for receiving a second portion of the convex profile of the layup, wherein the first contoured surface and the second contoured surface form a continuous surface,
a first end of the fixed mold abuts a second end of the movable mold;
a system that applies suction at the first contoured surface that holds the layup to the first contoured surface; and
a mechanism that translates the movable mold in a direction at least partially towards the first contoured surface of the fixed mold, breaking the continuous surface and releasing the layup from the composite layup tool;
molding a layup via the composite layup tool;
transferring the laminate to a curing tool after the movable mold has been translated; and
hardening the laminate at the curing tool after the transferring has been completed.

15. The method of claim 14 wherein:
the layup comprises multiple layers of fiber reinforced material.

16. The method of claim 14 wherein:
the composite layup tool further comprises a first plurality of vacuum ports that penetrate through the fixed mold into the first contoured surface.

17. The method of claim 16 wherein:
the composite layup tool further comprises a second plurality of vacuum ports that penetrate through the movable mold into the second contoured surface and apply suction at the second contoured surface that holds the layup to the second contoured surface.

18. The method of claim 17 wherein:
the composite layup tool further comprises a vacuum reservoir that supplies a vacuum to the first plurality of vacuum ports and to the second plurality of vacuum ports.

19. The method of claim 18 wherein:
the composite layup tool further comprises a third plurality of vacuum ports that penetrate through the fixed mold into the first contoured surface and apply suction at the first contoured surface that compresses a vacuum bag against the layup; and
the composite layup tool further comprises a fourth plurality of vacuum ports that penetrate through the movable mold into the second contoured surface and apply suction at the second contoured surface that compresses the vacuum bag against the layup.

20. The method of claim 14 wherein:
the layup is covered with a vacuum bag.

* * * * *